A. KONRAD.
SPRING WHEEL.
APPLICATION FILED SEPT. 22, 1910.

990,051.

Patented Apr. 18, 1911.

Witnesses
E. Larson
Charles Albilson

Inventor
August Konrad
By Robert Cobb
Attorneys

UNITED STATES PATENT OFFICE.

AUGUST KONRAD, OF HARTFORD, WISCONSIN.

SPRING-WHEEL.

990,051.  Specification of Letters Patent.  Patented Apr. 18, 1911.

Application filed September 22, 1910. Serial No. 583,276.

*To all whom it may concern:*

Be it known that I, AUGUST KONRAD, a citizen of the United States, residing at Hartford, in the county of Washington and State of Wisconsin, have invented certain new and useful Improvements in Spring-Wheels, of which the following is a specification.

This invention relates to wheels, and particularly to resilient spring wheels, being designed to construct a simple, durable, and inexpensive device of this nature.

With the above and other objects in view, this invention consists in the construction, combination, and arrangement of parts, all as hereinafter more fully described, claimed, and illustrated in the accompanying drawings, wherein—

Figure 1:
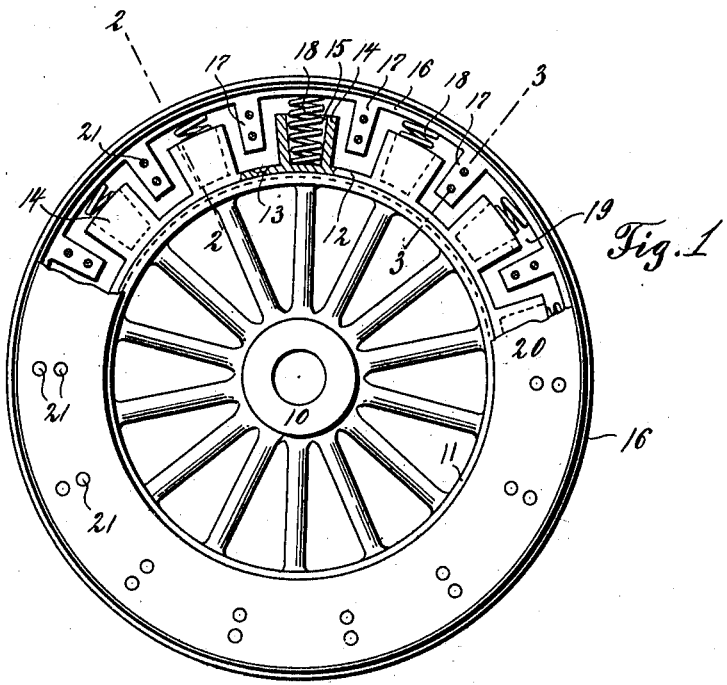
Figure 2:
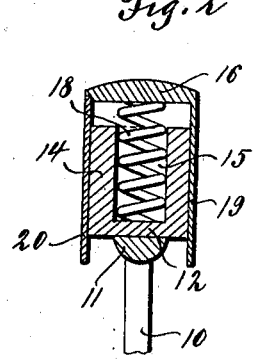
Figures 3, 4:
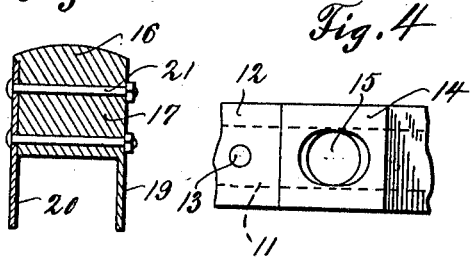

Figure 1 is a side elevation of a wheel constructed in accordance with the present invention, parts thereof being broken away and parts being shown in section; Fig. 2 is a transverse section taken along lines 2—2 of Fig. 1; Fig. 3 is a section taken along lines 3—3 of Fig. 1; Fig. 4 is a fragmentary top elevation of one of the spring retaining pockets carried by the wheel.

The spring wheel forming the subject matter of the present invention comprises a wheel of the ordinary structure having an inner rim detachably carried by the rim thereof, said inner rim having a series of radially extending pockets. An outer rim is spaced from the rim carrying the radially extending pockets and is provided with a series of inwardly extending lugs which are located between the pockets of the inner rim. A series of springs are carried by the pockets and bear against the outer rim between the inwardly projecting lugs aforesaid. A side plate is formed integrally on one side of the outer rim while a similar plate is carried on the opposite side thereof, said plate being secured to the outer rim by a series of bolts passing through the inwardly projecting lugs.

Referring more particularly to the drawings, 10 indicates a wheel of the usual construction having the ordinary rim 11 at the outer terminals of the spokes thereof. A secondary rim or inner rim 12 is carried by the rim 11 of the wheel and is secured thereto by a series of rivets or bolts 13. This secondary or inner rim 12 is provided with a series of radially extending pockets 14 which are provided with the passages 15 therein, the upper extremities of said passages being elliptical in formation, while the lower extremities thereof are circular as is illustrated in Figs. 1 and 4.

An outer rim 16 embraces the inner rim 13 and is spaced therefrom, said outer rim carrying a series of inwardly projecting lugs 17 which operate in the spaces between the radially extending pockets 14. A series of springs 18 are carried in the passages 15 of the pockets 14 and bear against the outer rim 16 in the space between the lugs 17. In order to retain the outer rim on the inner rim, a retaining or finishing plate 19 is formed integrally on one side of the rim 16 and extends inwardly, bearing against the inner rim 12. On the opposite side of the rim 16 is detachably carried the retaining and finishing plate 20 which is detachably secured to said rim by the bolts 21 which pass through the lugs 17 of the outer rim.

As above mentioned, the springs 18 bear against the rim 16 and since said springs are not oppositely connected with the rim 16, upon relative circumferential movement of the rims 13 and 16, the springs 18 will not become distorted but their outer ends will ride freely in contact with the outer rim. The resiliency of the springs 18 is not reduced in any way by the circumferential movement of the outer rim 16 with respect to the inner rim 13. The provision of the lugs 17 is advantageous in that these lugs perform a dual function because they form stops to engage with the walls of the pockets 14 to limit the relative circumferential movement of the rims 13 and 16. The lugs, furthermore, form socket members through which the fastenings 21 pass, the latter reinforcing the lugs as well as securing the side plate 20 at one side of the rims.

From this construction it will readily be seen that by removing the plate 20, the outer rim 16 may be removed and access may be easily had to the springs and inner rim 12.

Having thus fully described my invention, what is claimed as new is:—

In a spring wheel of the type described, the combination of an inner rim provided with radially extending pockets projecting outwardly therefrom, an outer rim surrounding the inner rim in spaced relation thereto and adapted for circumferential movement with respect to said inner rim, lugs extending inwardly from the outer rim between the pockets of the inner rim and engageable with the walls of said pockets, on circumferential movement of the outer rim relative to the inner rim, the outer rim being provided with a retaining plate extending inwardly therefrom and engaging an adjacent side of the inner rim, a separate retaining plate on the opposite side of the inner rim, fastenings passing through the lugs of the outer rim and securing the last mentioned plate thereto and reinforcing said lugs, and a plurality of coiled springs situated in the pockets of the inner rims and having their outer ends projecting outwardly from said pockets into engagement with the outer rim, the outer ends of said springs not being connected with the outer rim and freely movable in contact therewith on circumferential movement of the latter with respect to the inner rim.

In testimony whereof I affix my signature in presence of two witnesses.

AUGUST KONRAD.

Witnesses:
PHLIP KONRAD,
WM. WERNER.

---

Copies of this patent may be obtained for five cents each, by addressing the "Commissioner of Patents, Washington, D. C."